(12) United States Patent
Yap et al.

(10) Patent No.: US 6,510,057 B2
(45) Date of Patent: Jan. 21, 2003

(54) COMPUTING DEVICE WITH A CARD RECEPTACLE

(75) Inventors: Beng Tiek Yap, Singapore (SG); Foo Luen Wong, Singapore (SG); Ting Yeow Hoong, Singapore (SG)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/834,223

(22) Filed: Apr. 12, 2001

(65) Prior Publication Data

US 2002/0149915 A1 Oct. 17, 2002

(51) Int. Cl.[7] .................................................. H05K 5/06
(52) U.S. Cl. ........................ 361/752; 361/714; 361/730; 361/801; 174/35; 174/51 R; 257/99
(58) Field of Search .................................. 361/752, 724, 361/714, 816, 797, 800, 796, 753, 737, 814, 801; 174/35 R, 51 R; 257/99

(56) References Cited

U.S. PATENT DOCUMENTS

| 5,337,220 A | * | 8/1994 | Granitz ........................ 361/816 |
| 5,894,597 A | * | 4/1999 | Schwartz et al. ........... 455/558 |
| 5,933,328 A | * | 8/1999 | Wallace et al. ............. 361/737 |
| 5,983,290 A | * | 11/1999 | Obata et al. .................. 710/38 |

* cited by examiner

*Primary Examiner*—David Martin
*Assistant Examiner*—Hung Bui

(57) ABSTRACT

A computing device having a casing, a printed circuit board (PCB) and a card receptacle moveably supported by the casing for covering an orifice in the casing is disclosed. The card receptacle is spaced apart from the PCB in a closed position of the card receptacle to define a cavity therebetween. The card receptacle supports a connector that is connected to an electronic circuitry on the PCB. The card receptacle can be moved to at least one open position away from the orifice for receiving an electronic card and for allowing an additional module of the computing device to be inserted into the cavity for connection to the PCB.

1 Claim, 6 Drawing Sheets

COMPUTING DEVICE WITH A CARD RECEPTACLE

FIELD OF INVENTION

This invention relates, generally, to a computing device with a card receptacle, and more specifically, to a computing device with a card receptacle that is operable to allow access to a cavity suitable for receiving an expansion card, an additional circuit module, a backup battery or the like.

BACKGROUND

The use of computers becomes more prevalent every day. And as users become more mobile, a whole range of portable computing devices, such as laptop computers, notebook computers, handheld computers and palm-sized computers, have emerged in the market. The size of these computing devices has decreased while simultaneously the capabilities per unit volume have increased. As a result, manufacturers of these computing devices face many design challenges in creating a smaller and more powerful device.

The design challenges require that the computing devices be lightweight, by today's standards, and yet remain as powerful as some desktop computers. One approach to expanding the capability of a computing device, while maintaining or reducing the weight of the device, is to incorporate removable devices into the system which expand the number of functions and the computing capacity of the device.

As consumers buy and use computing devices for wider and more diverse applications, a user must be able to customize the capabilities of their computing device in accordance with their individual needs. Furthermore, computer users' needs may change over the lifetime of the device. Two devices that users have employed to customize their computing devices are a Personal Computer (PC) card and a compact flash (CF) card. The PC card is a credit-card-size package which can be plugged into a 68-pin host adapter socket built into the computing device. The CF card is smaller in size and can be plugged into a similar host adapter socket with 50 pins. Some manufacturers also introduce changeable proprietary circuit modules for upgrading the computing device.

Space in a computing device has to be allocated to accommodate the sockets and circuit modules. Typically, to increase accessibility, the sockets and circuit modules are laterally located on a base of a computing device, demanding that the computing device be of a certain minimum size. Other user accessible components typically found on a computing device such as a main battery, a backup battery, a power supply socket, an earphone socket also compete for the limited space in the computing device.

SUMMARY

According to an aspect of the present invention, there is provided a computing device having a casing and a printed circuit board (PCB) supported by the casing. The computing device includes a card receptacle moveably supported by the casing for covering the orifice. The card receptacle is spaced apart from the PCB in a closed position of the card receptacle to define a cavity therebetween. The card receptacle supports a connector that is connected to an electronic circuitry on the PCB. The card receptacle can be moved to at least one open position away from the orifice for receiving an electronic card and for allowing an additional module of the computing device to be inserted into the cavity for connection to the PCB.

BRIEF DESCRIPTION OF DRAWINGS

The invention will be better understood with reference to the drawings, in which.

DETAILED DESCRIPTION OF THE PREFERRED EMBODIMENT

Figure 1:
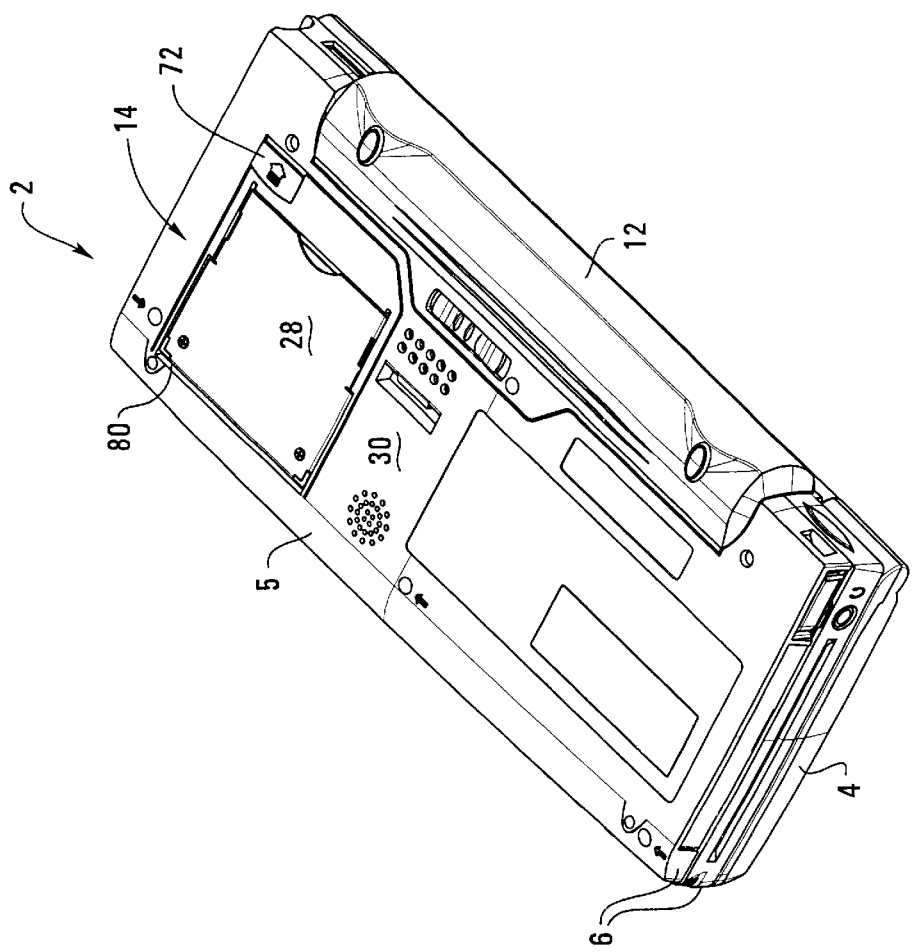
FIG. 1 is an isometric drawing showing the base of a handheld personal computer (H/PC) having a card receptacle mounted thereon (shown in a closed position).
Figure 2:
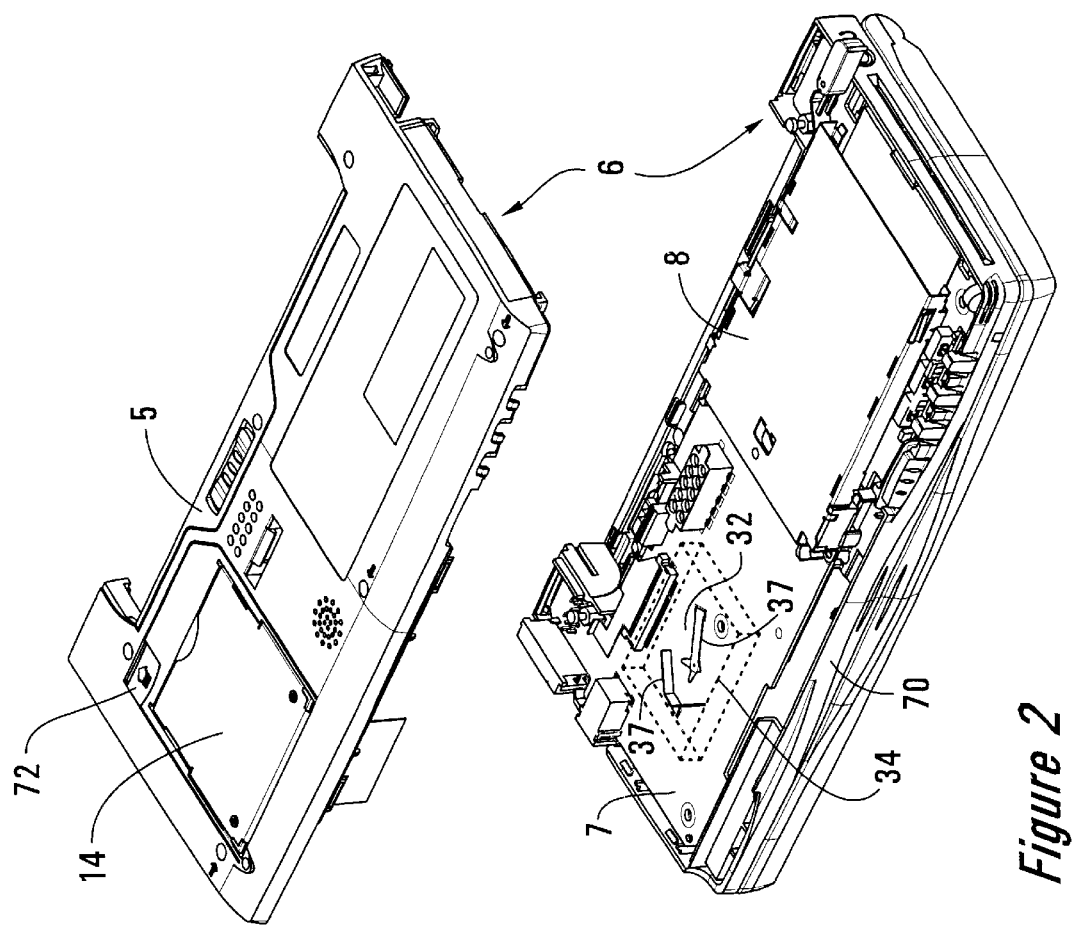
FIG. 2 is an exploded drawing of the H/PC in FIG. 1 showing a cavity defined between a printed circuit board (PCB) and the card receptacle in the closed position.

FIG. 1 is an isometric bottom view of a handheld personal computer (H/PC) 2 having a two-part casing shown in a closed position. The two-part casing includes an upper casing 4 hinged to a lower casing 6. FIG. 2 is an exploded drawing showing a base 5 separated from an upper portion 70 of the lower casing 6. The upper casing 4 supports a display (not shown). The lower casing 6 supports modules such as a keyboard (not shown), a printed circuit board (PCB) 7, a PCMCIA card receptacle 8, a speaker 10 (FIG. 6) and a main battery pack 12 (FIG. 1). The lower casing 6 also includes another card receptacle 14, such as a compact flash (CF) card receptacle, pivotably mounted to the base 5. The card receptacle 14 is shown in a closed position in FIGS. 1 and 2.

The card receptacle 14 includes a connector 22 (FIG. 4), such as a 50-pin male connector. In use, the card receptacle 14 receives an electronic card 24 (FIG. 3A), such as a CF card, and electrically connects the electronic card 24 to an electronic circuitry on the PCB 7 via the connector 22. In the closed position, the card receptacle 14 covers a rectangular orifice 26 (FIG. 3A) in the base 5 that leads to a cavity 34 (generally shown in dotted lines in FIG. 2) within the H/PC 2. Also in the closed position, an exterior 28 (FIG. 1) of the card receptacle 14 is substantially flush with an outside surface 30 (FIG. 1) of the base 5. When in the closed position, the card receptacle 14 is spaced apart from a portion 32 (FIG. 2) of the PCB 7 adjacent the card receptacle 14 to define the cavity 34 The orifice 26, when exposed allows user access to the cavity 34. The cavity 34 is able to accommodate an additional module of the H/PC 2, such as an expansion card, a circuit module, a backup battery or the like.

Figure 3A:
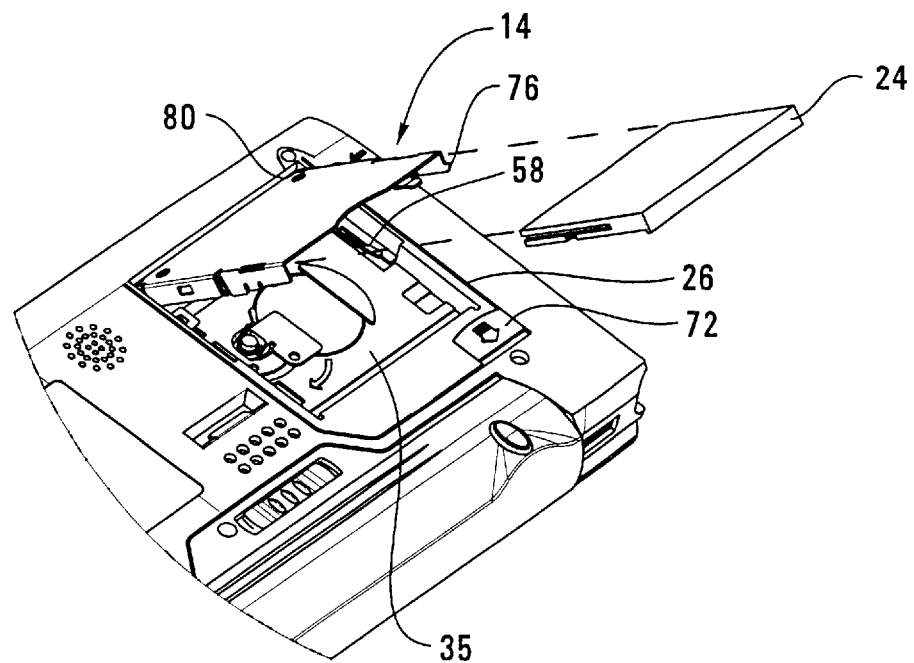
FIG. 3A is an isometric drawing of a portion of the card receptacle in FIG. 1 shown in a first open position for receiving a compact flash (CF) card.
Figure 3B:
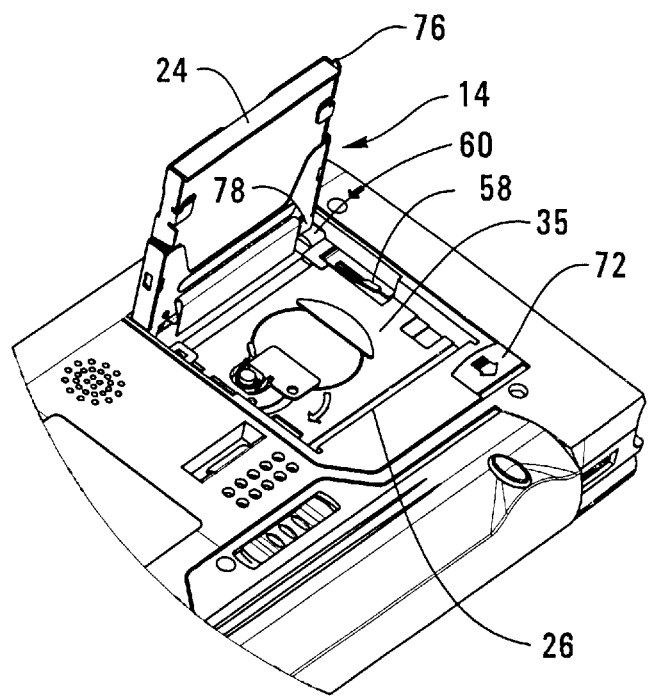
FIG. 3B is an isometric drawing of the portion of the card receptacle in FIG. 3A shown in a second open position to allow user access to the cavity in FIG. 2 used as a battery compartment.

FIGS. 3A and 3B show the cavity 34 being used to contain a battery guide 35 for proper location of a coin-type backup battery (not shown) in the cavity 34. The battery guide 35 is integrally molded with the base 5. The card receptacle 14 is moveable or tiltable to two discrete open positions including a first open position and a second open position as shown in FIGS. 3A and 3B respectively. In the first open position, the card receptacle 14 forms an angle of about 45 degrees with the base 5 to allow insertion of the electronic card 24 into the card receptacle 14. In the second open position, the card receptacle 14 forms an angle of about 90 degrees with the base 5 to allow a coin-type backup battery to be inserted into the cavity 34 for electrical connection to the PCB 7 via battery contacts 37.

Figure 4:
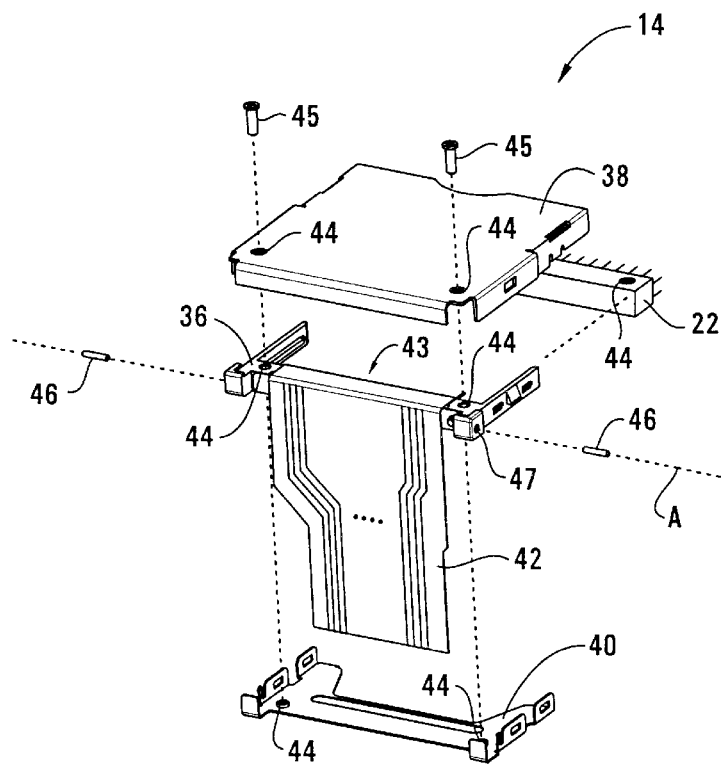
FIG. 4 is an exploded drawing of the card receptacle in FIG. 1.
Figure 5A:
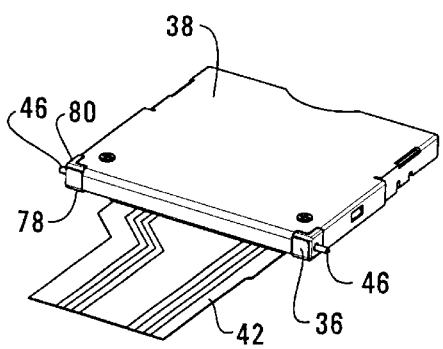
FIG. 5A is an isometric drawing of the assembled card receptacle in FIG. 4.
Figure 5B:
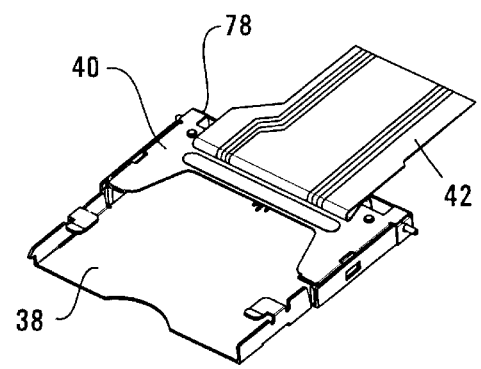
FIG. 5B is another isometric drawing of the assembled card receptacle in FIG. 4.

FIG. 4 is an exploded drawing of the card receptacle 14. In addition to the connector 22, the card receptacle 14 includes a U-shaped bracket 36, a first panel 38, a second panel 40 and a flexible circuit 42 that is electrically connected to the connector 22. During assembly, the connector 22 is inserted against a middle portion 43 of the bracket 36 and the subassembly of the bracket 36 and the connector 22 is sandwiched between the first and second panels 38, 40. The bracket 36, the first panel 38, the second panel 40 and the connector 22 each have a pair of apertures 44 that are aligned to allow them to be rigidly mounted to each other using screws 45 to form the card receptacle 14. Two hinge pins 46 are press fitted into corresponding bracket apertures 47 aligned along an axis A to allow the card receptacle 14 to tilt about the axis A. The assembled card receptacle 14 is shown in FIG. 5A. The flexible circuit 42 is folded and attached using an adhesive tape (not shown) to the second panel 40 as shown in FIG. 5B.

Figure 6:
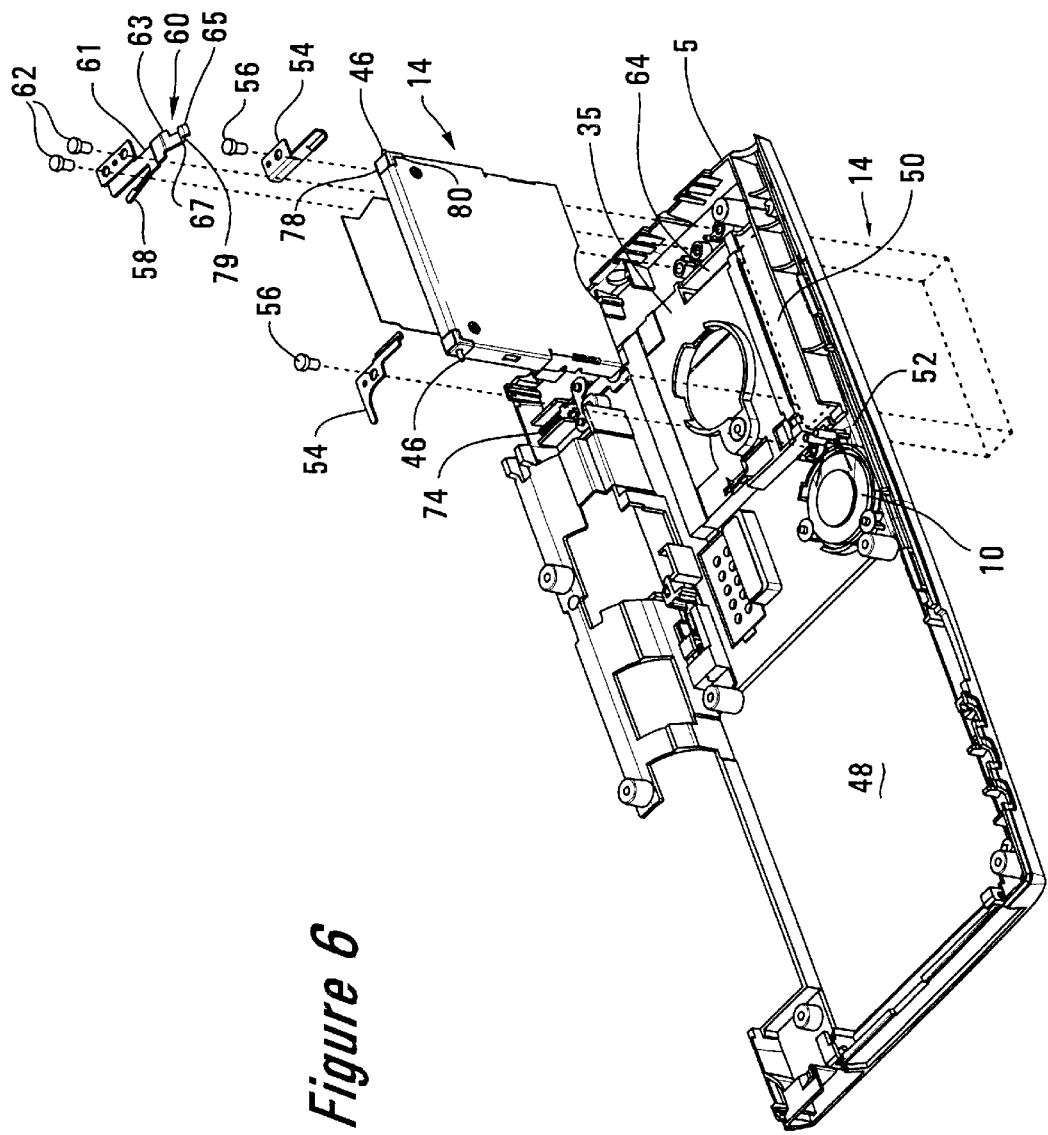
FIG. 6 is an exploded drawing of the assembled card receptacle and parts required for mounting the card receptacle to the base in FIG. 1.

The mounting of the card receptacle 14 to the base 5 is next described with the aid of FIG. 6 which shows an exploded drawing of the assembled card receptacle 14 and parts required for mounting it. The assembled card receptacle 14 is placed from an inside surface 48 through an elongated opening 50 to allow its two hinge pins 46 to be lodged against two axially aligned slots 52 on the inside surface 48. The card receptacle 14 when placed in this position is shown in dotted lines in FIG. 6. Two retaining plates 54 are fixedly attached using screws 56 to the inside surface 48 over the slots 52 to prevent the hinge pins 46 and therefore the card receptacle 14 from being dislodged.

Additionally, an integral biasing means 58 and detent 60 is fixedly attached using screws to the base 5. The biasing means 58 biases the card receptacle 14 towards the open positions. The detent 60 is contoured to allow it to interact with a portion of the card receptacle 14 to hold the card receptacle 14 in the discrete open positions. The base 5 is attached to the upper portion 70 (FIG. 2) of the lower casing 6 to complete the assembly of the lower casing 6.

Figure 7A:
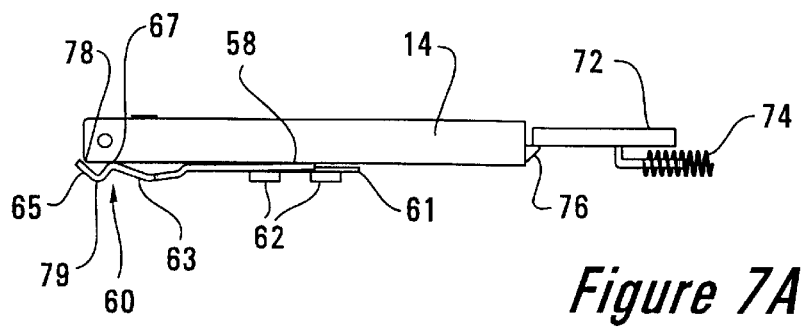
FIG. 7A is a side elevational view of the card receptacle shown latched in the closed position.
Figure 7B:
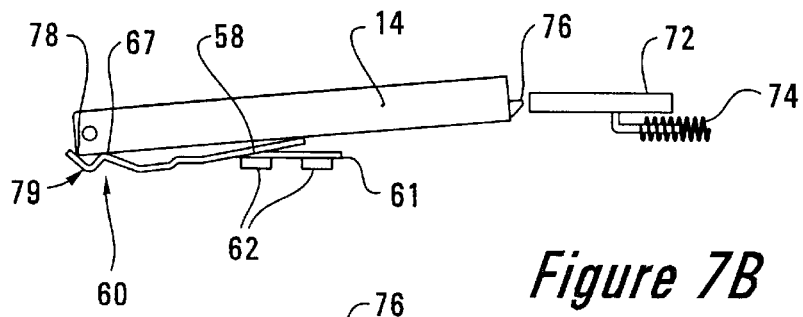
FIG. 7B is a side elevational view of the card receptacle shown urged to an unlatched position.
Figure 7C:
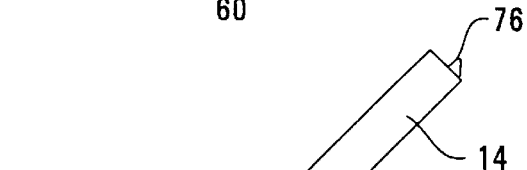
FIG. 7C is a side elevational view of the card receptacle shown tilted to a first open position to form an angle of about 45° with the base.
Figure 7D:
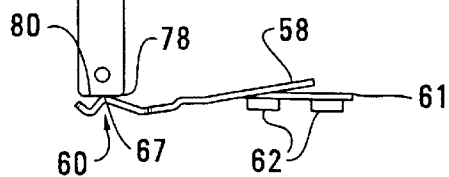
FIG. 7D is a side elevational view of the card receptacle shown tilted to a second open position to form an angle of about 90° with the base.

The H/PC 2 further includes a latch 72 (FIG. 7A) that is supported by the base 5. A spring 74 (FIG. 6) biases the latch 72 into the rectangular orifice 26 to engage a protrusion 76 (FIG. 3A) of the card receptacle 14 to lock the card receptacle 14 in the closed position. When in the closed position, the biasing means 54 is loaded. When the latch 72 is moved away from the rectangular orifice 26 to release the card receptacle 14, the force in the loaded biasing means 58 pushes the card receptacle 14 away from the closed position towards the open positions as shown in FIGS. 7B and 7C.

Although the invention is described in the preferred embodiment, it should not be construed to be limited to the particular embodiment. For example, the invention may be implemented in any computing device that requires a card receptacle that is moveable to allow user access to a cavity for containing an additional module of the computing device.

We claim:

1. A computing device comprising:

a casing having an orifice;

a printed circuit board (PCB) supported by the casing;

a card receptacle pivotably mounted to the casing for covering the orifice, the card receptacle being spaced apart from the PCB in a closed position of the card receptacle to define a cavity therebetween;

a connector connected to an electronic circuitry on the PCB that is supported by the card receptacle;

a latch mounted to the casing for releasably engaging the card receptacle to retain the card receptacle in the closed position;

a biasing means mounted to the casing for urging the card receptacle to an unlatched position when the latch is released; and a detent mounted to the casing for bearing against the card receptacle to hold the card receptacle in place when tilted to a first and a second predetermined open position.

* * * * *